Feb. 19, 1963  H. W. CHRISTIE  3,078,201
SEAM STRUCTURE FOR A FLEXIBLE BAG
Filed March 21, 1960
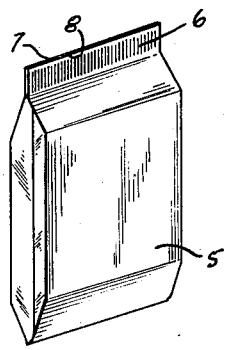
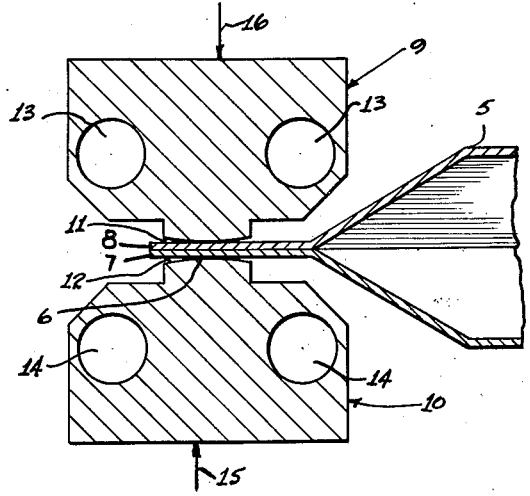
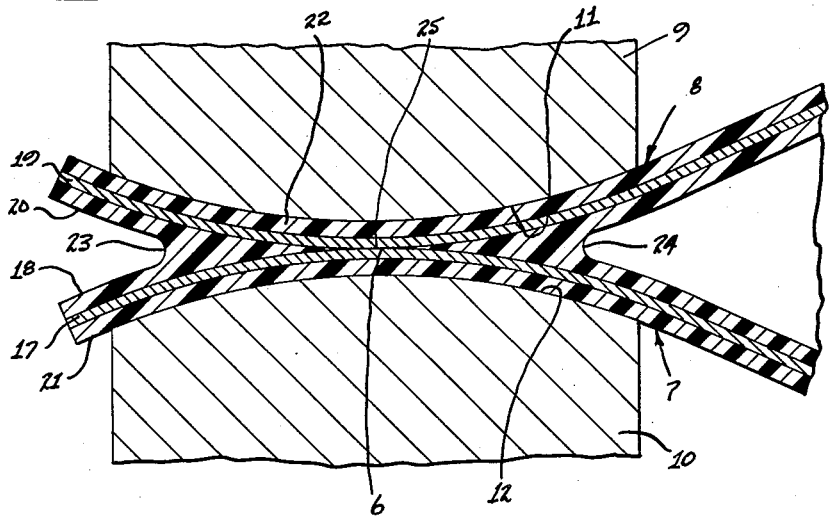
Inventor
Howard W. Christie

# United States Patent Office 3,078,201
Patented Feb. 19, 1963

3,078,201
SEAM STRUCTURE FOR A FLEXIBLE BAG
Howard W. Christie, Kansas City, Mo., assignor to Midwest Research Institute, Kansas City, Missouri, a corporation of Missouri
Filed Mar. 21, 1960, Ser. No. 16,417
3 Claims. (Cl. 154—43)

The present invention relates to improvements in seals or seams and methods for forming seals between sheets of laminated material having a layer of infusible material and a layer of plastic fusible by heat with the sheets positioned so that the plastic layers are in facing relationship.

Laminated barrier packaging materials are used in environments where protection of the container contents is important. Such materials consist of layers of plastic films and metallic foils. These hermetic packaging materials, for example, may consist of an outer layer of a strong material such as polyethylene terephthalate or cellulose acetate, a middle layer of metallic foil, and an inner layer of readily fusible thermoplastic such as polyethylene or a vinyl resin such as polyvinyl chloride. The outer layer serves a dual purpose of giving strength to the laminate and provides protection for the metallic foil. The foil layer serves as a barrier to gaseous vapors. The inner layer serves to protect the metallic foil and also provides a material that can be heat fused for sealing the package. The materials of this general type are used in packaging of foodstuffs, pharmaceuticals, chemicals, fine instruments and other items that must have complete protection from contact of or contamination by gaseous products. Dehydrated foodstuffs, for example, will require a package that will provide complete exclusion of water vapors and other undesirable atmospheric contaminants. Requirements for the packaging material and the seal for the package require the utmost in stability and may encounter environments of heat ranges from —60° to 160° F., humidity in the ranges from 0% to 100% relative humidity, and pressures from sea level to 50,000 feet.

It is desirable that the seal strength efficiency (strength of the seal divided by the strength of the material) approach 100% to evoke the most economical use of the packaging material and eliminate the seal as being the weakest part of the package. Seals heretofore used while effective in their unstressed state, usually have a seal efficiency in the range of 40% to 60%. The low strength and efficiency of the seals are caused by the development of high stress concentration at the seam line when a load is applied to the seal. A commonly used type of seal joins the sheets of material in facing relationship and peeling stresses on this type of seal occur in the thermoplastic sealable layer over a very limited area resulting in a high stress concentration and failure of the seal before the overall load approaches the ultimate strength of the packaging material.

It is an object of the present invention to provide an improved seal and an improved method of forming a seal between layers of laminated material with the inner surfaces of the material having a layer of material fusible with the application of heat.

Another object of the invention is to provide an improved seal between layers of laminated material having a fillet or bead of thermoplastic material formed beside a seam line to obtain a seal approaching 100% efficiency.

Another object of the invention is to provide an improved method for forming a seal between sheets of thermoplastic coated material with the application of heat and pressure in amounts so that the thermoplastic will be converted to a fluid state and will be displaced laterally of a seam line with the zone between the layers at the seam line substantially void of thermoplastic material and a fillet formed adjacent the seam line.

A still further object of the invention is to provide a method for producing a seam between layers of thermoplastic coated material by the application of curved surface sealing faces heated to a critical temperature range and applied to the material with a critical high force and for a critical period of time to force and displace substantially all of the thermoplastic to form a fillet and a seam structure so that peel stresses at the seam will be changed to shear stresses.

Other objects and advantages will become more apparent with the teaching of the principles of the invention in connection with the disclosure of the preferred embodiments thereof in the specification, claims and drawings, in which:

FIGURE 1 is a perspective view of a bag with a closing seam illustrating the type of environment in which a seam formed in accordance with the principles of the present invention may be used;

FIGURE 2 is a side elevational view of sealing members forming a seam along the top of a bag; and, FIGURE 3 is an enlarged fragmentary vertical sectional view showing the seam being formed and showing the appearance of the finished seam.

As shown on the drawings:

As illustrated in FIGURE 1, a flexible bag 5 is provided for containing materials such as foodstuffs and is formed of layers 7 and 8 joined together along the top of the bag at a seam line 6.

As shown in FIGURE 2, the seam is preferably formed by heated sealing jaws 9 and 10 having curved fragmentary cylindrical sealing surfaces 11 and 12 which are elongated so that the surfaces will tend to meet substantially along a straight line and the jaws are aligned so that they will be in line with the seam line 6. Heat is applied to the seam preferably by heating the jaws and they are shown as being bored to contain tubular heating elements 13 and 14 raising the jaws to a temperature to bring the plastic in the seam to a fluid state, as will be described.

The jaws are forced together by force applying means shown schematically at 15 and 16.

The layers or sheets 7 and 8 of material between which the seam is formed are laminated and have intermediate layers 17 and 19 of a non-fusible preferably moisture barrier material such as aluminum foil on the order of 0.001 inch in thickness. The outer surface of the aluminum foil may be protected by layers 21 and 22 of material such as polyethylene terephthalate or similar material on the order of 0.001 inch thick. It will be understood that other materials may be employed. The sheets have inner layers 18 and 20 of plastic fusible by heat, or thermoplastic, with these layers being in facing relationship. The inner layer may be one of the plastics of the group of vinyl resins or may be polyethylene. A layer preferably on the order of 0.0015 inch thick is preferred and may be in the range of 0.001 to 0.005 inch thick for practical use.

At the location 25 in FIGURE 3, which is coincident with the seam line 6, the area is void of thermoplastic with the plastic having been laterally displaced of the seam line to form thickened fillets 23 and 24 of the material. These fillets are integral with the inner plastic layers 18 and 20 of the sheets and the resultant seam will approach 100% efficiency.

I have found that critical ranges exist in order to perform the method of forming the seal as above described. Heat must be applied to the seam to bring the thermoplastic to a viscous or a fluid state and temperatures in the range of 200° F. to 600° F. form the range of accepted temperatures. If the second or inner thermoplastic layer of the sheets is polyethylene, I have found that 345° F. is optimum and that temperatures varying substantially from this temperature do not increase the strength of the seal but in some circumstances will decrease its strength. If the thermoplastic inner layers of the sheets are polyvinyl chloride I have found that the optimum temperature of the heat applying means is 425° F.

Sealing forces are applied to the outer surfaces of the sheets to displace laterally the fluid thermoplastic with the forces being maximum along the center line of the seam and decreasing laterally away from the seam line to cause the lateral displacement. These pressures must be high and they must be in the range of 500 pounds to 5000 pounds per square inch measured substantially at the center of the seam line.

The pressure must be applied for an adequate time to permit the flow of the fluid thermoplastic laterally to form the fillets and I have found that the time must be within the range of one-tenth second to five minutes.

It will be understood of course that the factors of temperature, pressure and time duration of application of pressure are interdependent. However, temperatures, times and pressures below the above minimums will cause a flow of plastic below the desired limits. Also, temperatures, times and pressures above said maximum limits will cause degradation of the plastic or be ineffective for the purposes intended. Pressures above maximum limits will also tend to damage the metallic foil layer of the material.

The curvature of the radius of the sealing jaws should be between one-sixteenth inch and five inches to obtain formation of a suitable fillet.

In operation, the sheets of material are positioned with the inner layers of thermoplastic in facing relationship and the heated sealing members are applied to the seam line. Temperature and pressures are used for a period of time that will force the viscous thermoplastic laterally away from the seam line leaving the area at the seam line substantially void of thermoplastic and forcing the thermoplastic laterally outwardly to form fillets. When the sealing members are removed the thermoplastic will set completing the seal.

The large fillet or bead formed will spread the load over a bigger area. A seal is thus formed where the load is a tensile load on the thermoplastic rather than a peeling load on the seal.

As will be understood, while the above principles are discussed in connection with forming a seam between two facing layers of material, they may be employed in forming other seams.

The method has been found very effective for forming seams where foreign materials are present on the surfaces of the plastic. In bags or containers filled with substances the substances frequently contaminate the surface, and materials such as water, flour, powdered cocoa and hydrogenated vegetable oil have been found to leave a film on the surface which normally greatly reduces the strength of seals. With the present method the formed seal overcomes the contamination and the adverse effects are greatly minimized.

As example, the following seals were formed utilizing the steps of the method.

*Example 1*

Temperature _____ 345° F.
Pressure _____ 3,400 lbs./in.² at seal line.
Time duration _____ 1.0 sec.
Jaw radius _____ 0.5".

The material used was laminated with an outer layer of polyethylene terephthalate 0.0005 inch thick, an intermediate layer of aluminum foil 0.001 inch thick, and an inner layer of polyethylene 0.0015 inch thick. A very satisfactory seal was formed having a strength of 18.5 pounds per linear inch which was equal to the tensile strength of the laminate.

*Example 2*

Temperature _____ 425° F.
Pressure _____ 3,400 lbs./in.² at seal line.
Time duration _____ 0.6 sec.
Jaw radius _____ 0.5".

A material similar to Example 1 was used except that the inner layer was 0.0015 inch of polyvinyl chloride. A very satisfactory seal was formed having a strength of 18.8 pounds per linear inch of seal, an efficiency of 97 percent.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A seam structure for a flexible bag comprising first and second sheets each having layers with one layer formed of a non-fusible material and an inner layer formed of a fusible plastic of a thickness in the range of 0.001 to 0.005 inch, said sheets positioned with said inner layers in facing relationship, a seam line across said sheets characterized by a substantial absence of said inner layers, and a fillet on at least one side of said seam line formed of the material of said inner layers and being integral therewith and having a curved inner surface so that forces tending to separate the seam are at least partly transformed from peeling loads to shear loads, said inner layers being unjoined beside said fillet outwardly of said seam line.

2. A seam structure for a flexible bag comprising a sheet having first and second layers with the first layer formed of a non-fusible material and the second inner layer formed of a fusible plastic, another sheet having first and second layers with the first layer formed of a non-fusible material and the second inner layer formed of a fusible plastic, said sheets positioned with said inner layers in facing relationship, a seam line across said sheets characterized by a reduced thickness of said inner layers, and a fillet on at least one side of said seam line formed of the material of said inner layers and being integral therewith and transforming forces tending to separate the seam from peeling loads to tension loads.

3. A seam structure for a flexible bag comprising sheets each having first and second layers with the first layers formed of a non-fusible material and the second inner layers formed of a fusible plastic, said sheets positioned with said inner layers in facing relationship, a seam line across said sheets characterized by a substantial reduction of the thickness of said inner layers, and a fillet on at least one side of said seam line formed by the application of curved sealing faces to the outer layers of the sheets at a temperature and with a pressure to displace the inner plastic layer laterally of the seam line.

References Cited in the file of this patent

UNITED STATES PATENTS

| | | |
|---|---|---|
| 2,341,845 | Mark | Feb. 15, 1944 |
| 2,343,117 | Vincent | Feb. 29, 1944 |
| 2,510,727 | Sussenback | June 6, 1950 |
| 2,596,933 | Kirk | May 13, 1952 |
| 2,614,953 | Anglada | Oct. 21, 1952 |
| 2,679,467 | Bedford | May 25, 1954 |
| 2,712,343 | Stanton | July 5, 1955 |
| 2,735,797 | Schjeldahl | Feb. 21, 1956 |
| 2,902,396 | Reynolds | Sept. 1, 1959 |

FOREIGN PATENTS

| | | |
|---|---|---|
| 1,105,625 | France | July 6, 1955 |